(12) United States Patent
Huang et al.

(10) Patent No.: US 8,465,215 B1
(45) Date of Patent: Jun. 18, 2013

(54) PLUGGABLE APPARATUS

(71) Applicant: Huawei Technologies Co., Ltd., Guangdong (CN)

(72) Inventors: Danhua Huang, Wuhan (CN); Jingxuan Cai, Wuhan (CN); Yu Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/763,254

(22) Filed: Feb. 8, 2013

Related U.S. Application Data

(63) Continuation of application No. PCT/CN2011/078996, filed on Aug. 26, 2011.

(30) Foreign Application Priority Data

Dec. 29, 2010 (CN) .......................... 2010 1 0616186

(51) Int. Cl.
*G02B 6/36* (2006.01)
*G02B 6/42* (2006.01)
*H01R 13/62* (2006.01)

(52) U.S. Cl.
USPC ................ 385/92; 385/56; 385/75; 439/160; 439/347

(58) Field of Classification Search
None
See application file for complete search history.

(56) References Cited

U.S. PATENT DOCUMENTS

| | | | |
|---|---|---|---|
| 6,824,416 B2 | 11/2004 | Di Mascio | |
| 6,872,010 B1 | 3/2005 | Bianchini | |
| 2004/0161958 A1 | 8/2004 | Togami et al. | |
| 2005/0208822 A1* | 9/2005 | Ishigami et al. | 439/372 |
| 2007/0123090 A1 | 5/2007 | Kim et al. | |
| 2009/0220227 A1 | 9/2009 | Wong et al. | |

FOREIGN PATENT DOCUMENTS

| | | |
|---|---|---|
| CN | 2494511 Y | 6/2002 |
| CN | 2738478 Y | 11/2005 |
| CN | 2758794 Y | 2/2006 |
| CN | 201196690 Y | 2/2009 |
| CN | 201341283 Y | 11/2009 |
| CN | 101614850 A | 12/2009 |
| CN | 201464679 U | 5/2010 |

OTHER PUBLICATIONS

International Search Report in corresponding International Patent Application No. PCT/CN2011/078996 (Dec. 1, 2011).
Written Opinion of the International Searching Authority in corresponding International Patent Application No. PCT/CN2011/078996 (Dec. 1, 2011).

* cited by examiner

*Primary Examiner* — Jerry Rahll
(74) *Attorney, Agent, or Firm* — Leydig, Voit & Mayer, Ltd.

(57) ABSTRACT

A pluggable apparatus is provided in the present invention. The pluggable apparatus includes one base, one pull tab, at least one elastic piece, two sliding plates, and one front cover. The pull tab includes two rotary shafts arranged symmetrically and is rotatably arranged at one end of the base through the rotary shafts. The at least one elastic piece includes one first elastic arm and one second elastic arm. The at least one elastic piece is arranged on one of the rotary shafts of the pull tab and is held against the pull tab through the first elastic arm. The two sliding plates are slidably arranged on two sides of the base and are connected to the pull tab. The front cover is arranged on the base and is held against the second elastic arm of the elastic piece.

11 Claims, 7 Drawing Sheets

PLUGGABLE APPARATUS

CROSS-REFERENCE TO RELATED APPLICATIONS

This application is a continuation of International Patent Application No. PCT/CN2011/078996, filed on Aug. 26, 2011, which claims priority to Chinese Patent Application No. 201010616186.5, filed on Dec. 29, 2010, both of which are hereby incorporated by reference in their entireties.

FIELD OF THE INVENTION

The present invention relates to a pluggable apparatus, and in particular, to a pluggable apparatus applied in the communications field.

BACKGROUND OF THE INVENTION

As communications products tend to be increasingly compact, integrated, and fast, pluggable transmission apparatuses are increasingly popular in communications apparatuses. For example, XFP opto-electronic modules (10 Gigabit Small Form Factor Pluggable Modules, 10 gigabit small form factor pluggable optical modules) are widely used in the optical communications field following SFP opto-electronic modules (small form-factor pluggable opto-electronic modules), and the MSA (Multisource Agreement) protocol for the XFP modules is used to define the XFP modules. As stipulated by the protocol, an XFP module needs to be unlocked using a self-contained unlocking apparatus so that the XFP module can smoothly disengage from the shell of the system mother board. However, in the prior art, the unlocking apparatus is incapable of automatically resetting after the apparatus is unlocked.

SUMMARY OF THE INVENTION

Embodiments of the present invention provide a pluggable apparatus that is capable of automatically resetting.

A pluggable apparatus, where the pluggable apparatus includes a base, a pull tab, an elastic piece, two sliding plates, and a front cover. The pull tab includes two rotary shafts arranged symmetrically and is rotatably arranged at one end of the base through the rotary shafts. The elastic piece includes a first elastic arm and a second elastic arm arranged with a spacing from the first elastic arm. The elastic piece is arranged on a rotary shaft of the pull tab and is held against the pull tab through the first elastic arm. The two sliding plates are slidably arranged on two sides of the base and are connected to the pull tab. The front cover is arranged on one end of the base where the pull tab is arranged, and is held against the second elastic arm of the elastic piece. The pull tab drives the sliding plates to slide along the base by means of rotation thereof so as to unlock the pluggable apparatus. The first elastic arm and the second elastic arm of the elastic piece approach each other to generate an elastic deformation during the unlocking process, and push the pull tab and the sliding plates to return to initial positions after the unlocking is completed.

With the pluggable apparatus in the embodiments of the present invention, the pluggable apparatus automatically resets through an elastic piece after being unlocked, making the pluggable apparatus easy to use. In addition, the pluggable apparatus can be unlocked without separate components such as pins, rivets, and rotary shafts. Therefore, with a simple functional structure, the pluggable apparatus is easy to manufacture, thereby reducing the manufacturing cost and increasing the productivity.

DETAILED DESCRIPTION OF THE EMBODIMENTS

Figure 1:
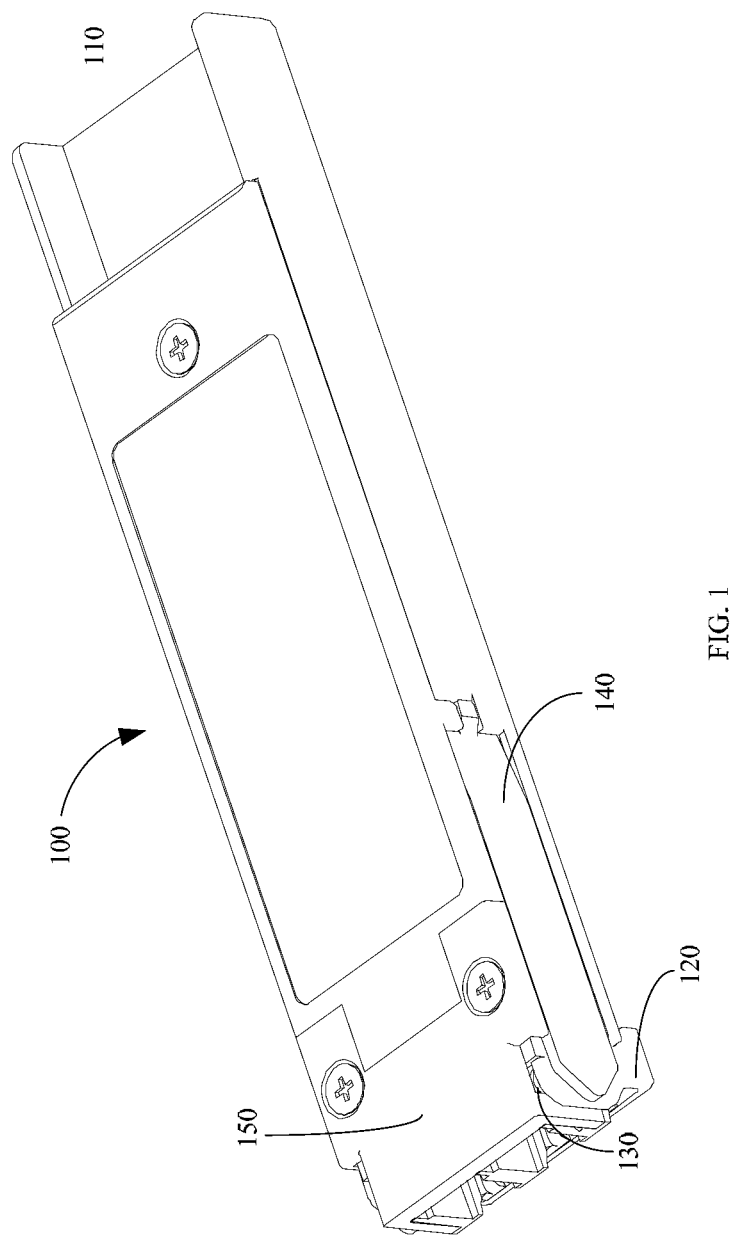
FIG. 1 is a schematic three-dimensional diagram of a pluggable apparatus according to an embodiment of the present invention.
Figure 2:
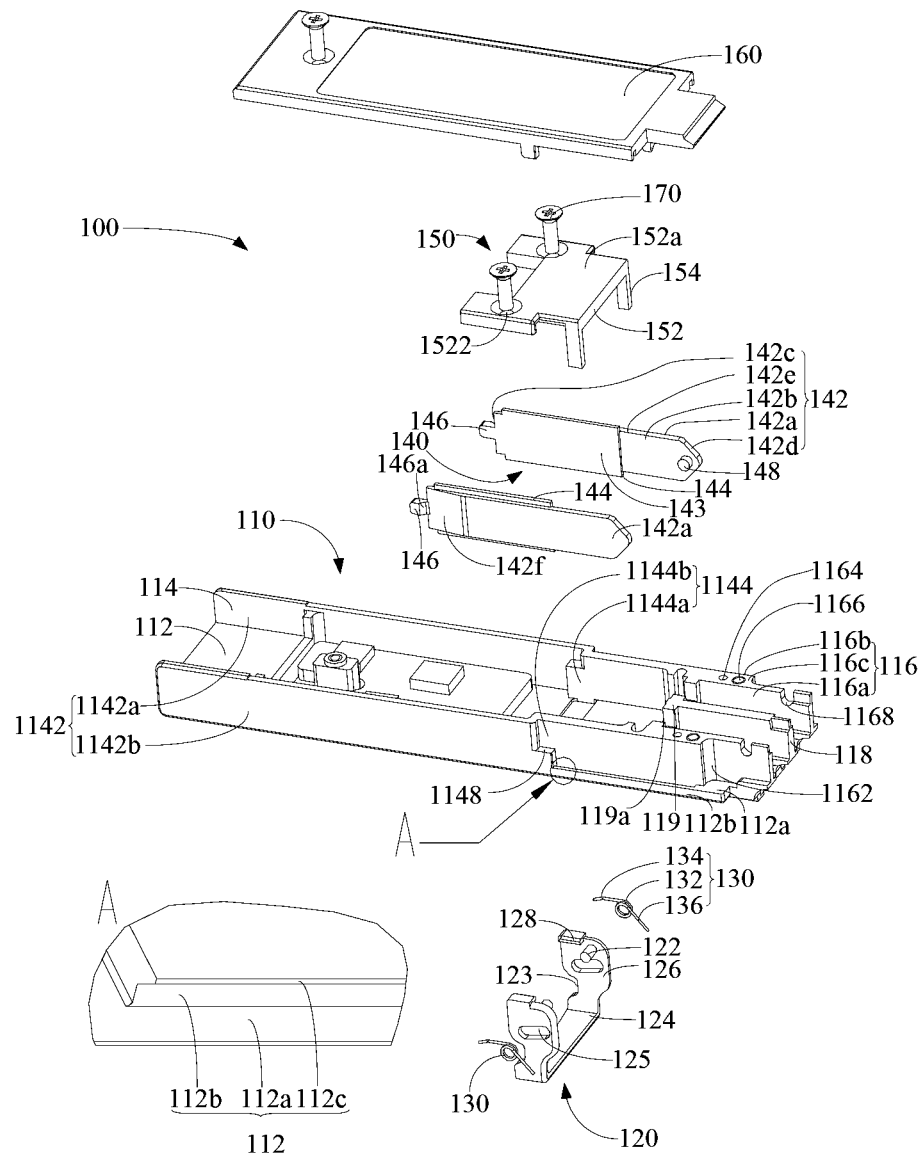
FIG. 2 is a schematic exploded diagram of the pluggable apparatus in FIG. 1 in a direction.
Figure 3:
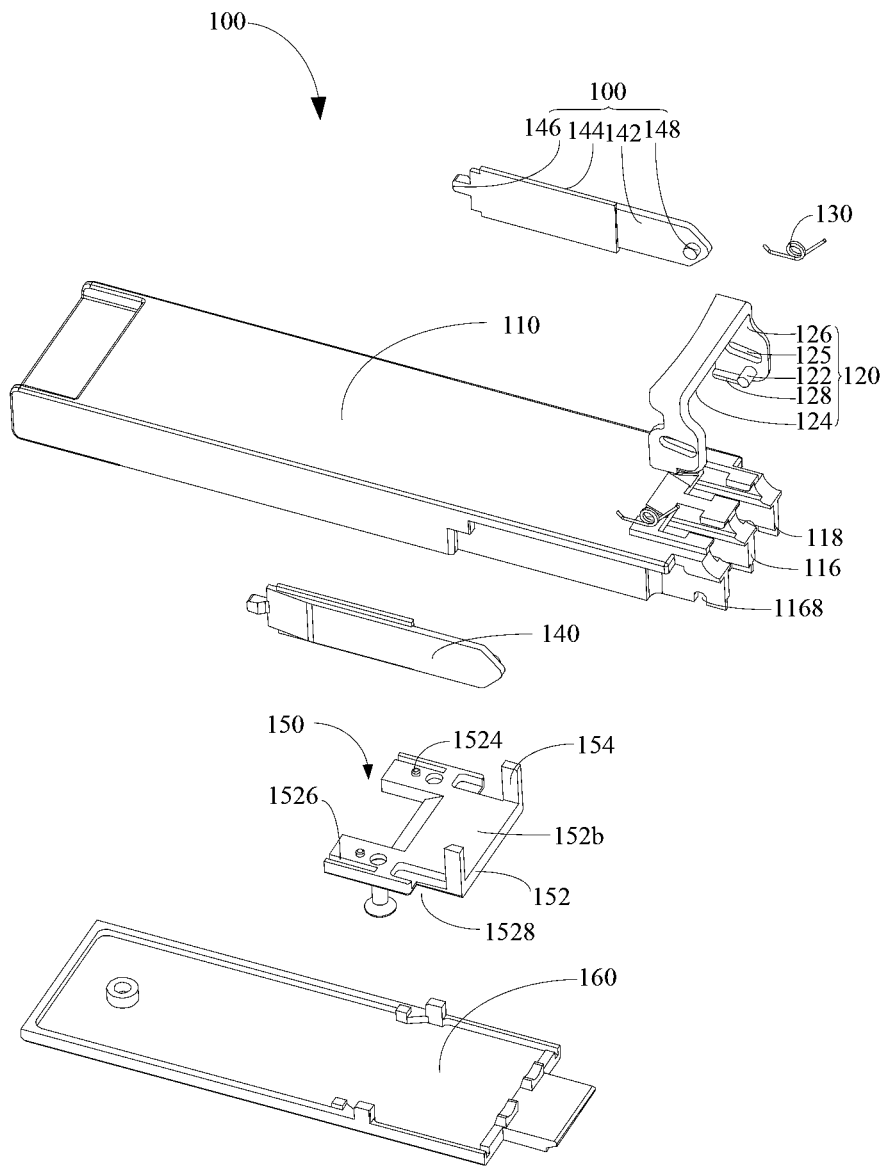
FIG. 3 is a schematic exploded diagram of the pluggable apparatus in FIG. 1 in another direction.

Referring to FIG. 1 to FIG. 3, an embodiment of the present invention provides a pluggable apparatus 100. The pluggable apparatus 100 includes one base 110, one pull tab 120, at least one elastic piece 130, two sliding plates 140, and one front cover 150. The pull tab 120 includes two symmetrically arranged rotary shafts 122 and is rotatably arranged at one end of the base 110 through the rotary shafts 122. The at least one elastic piece 130 includes one connecting portion 132, a first elastic arm 134 connected to the connecting portion 132, and a second elastic arm 136 connected to the connecting portion 132 and arranged with a spacing from the first elastic arm 134. The at least one elastic piece 130 is arranged on one of the rotary shafts 122 of the pull tab 130 through the connecting portion 132 and is held against the pull tab 120 through the first elastic arm 134. The two sliding plates 140 are slidably arranged on two sides of the base 110 and are connected to the pull tab 120. The front cover 150 is arranged on one end of the base 110 where the pull tab 120 is arranged; the second elastic arm 136 of the elastic piece 130 is received in a space formed between the front cover 150 and the pull tab 120. The pull tab 120 drives the sliding plates 140 to slide along the base 110 by means of rotation thereof so as to unlock the pluggable apparatus 100. The first elastic arm 134 and the second elastic arm 136 of the elastic piece 130 approach each other to generate an elastic deformation during the unlocking process, and push the pull tab 120 and the sliding plates 140 to return to initial positions after the unlocking is completed.

The base 110 includes one bottom plate 112, two side plates 114 arranged in parallel on two sides of the bottom plate 112, and two notched side plates 116 that extend from end portions of the two side plates 114 in an extension direction parallel to the side plates 114, one spacer plate 118 arranged between the two notched side plates 116 and connected to the bottom plate 116, and a supporting plate 119 perpendicularly connected to the notched side plates 116, the spacer plate 118, and the bottom plate 112.

In this embodiment, the bottom plate 112 is a regular quadrangle and includes one upper surface 112a and a plurality of side surfaces 112b surrounding the upper surface 112a.

The two side plates 114 are perpendicularly arranged on the upper surface 112a of the bottom plate 112. Each of the side plates 114 includes one front plate 1142 and one rear plate 1144 connected to the front plate 1142. Each of the front plates 1142 includes one first inner side surface 1142a and one first outer side surface 1142b. In this embodiment, the first outer side surfaces 1142b of the two front plates 1142 are respectively coplanar with the two parallel side surfaces of the bottom plate 112, but are not limited to this structure. The first outer side surface 1142b of the front plate 1142 may also be parallel to and staggered by a certain distance from the side surface 112b of the bottom plate 112. Each of the front plates 1144 includes one second inner side surface 1144a and one second outer side surface 1144b. Each of the rear plates 1144 is connected to the front plate 1142 in a parallel and staggered mode, that is, connected to the first inner side surface 1142a of the front plate 1142 through the second outer side surface 1144b of the rear plate 1144. In this way, one sliding groove 1146 is formed between the second outer side surface 1144b of each of the rear plates 1144, the upper surface 112a of the bottom plate 112, and one end of the front plate 1142 that is close to the rear plate 1144. One supporting block 1148 is formed at the junction of the front plate 1142, the rear plate 1144, and the bottom plate 112. The height of the supporting block 1148 relative to the surface 112a of the bottom plate 112 is lower than the height of the side plate 114 relative to the surface 112a of the bottom plate 112. One limiting groove 112c is arranged at a position of the bottom plate 112 that is close to the rear plate 1144 to limit the travel of the sliding plate 140.

The two notched side plates 116 are formed on the bottom plate 112, are respectively connected to end portions of the two side plates 1144, and are parallel to the rear plate 1144. Each of the notched side plates 116 includes one inner side wall 116a, one outer side wall 116 opposite to the inner side wall 116a, and one top wall 116c that connects the inner side wall 116a and the outer side wall 116b. In this embodiment, the outer side wall 116b of each of the notched side plates 116 is coplanar with the second outer side surface 1144b of the connected rear plate 1144, but is not limited to this structure. Any structure complying with the XFP MSA protocol specification can be arranged between the outer side wall 116b and the second side surface 1144b as required. One notch 1162 is arranged at one end of the outer side wall 116b of each of the notched side plates 116 that is far away from rear plate 1144, and the notch 1162 extends from the top wall 116c of the notched side plate 116 to the surface 112a of the bottom plate 112. One locking hole 1164 and one positioning hole 1166 close to the locking hole 1164 are formed on the top wall 116c of each of the notched side plates 116 that is close to the notch 1162. One bearing notch 1168 for bearing a rotary shaft is arranged at a position of the inner side wall 116a of each of the notched side plates 116 that corresponds to an end portion of the notch 1162 to bear the rotary shaft 122 of the pull tab 120. In this embodiment, the bearing notch 1168 is semi-circular, but is not limited to this shape. The bearing notch 1168 may be a closed circle or an arc with a smooth bottom surface.

The spacer plate 118 is perpendicularly arranged on the surface 112a of the bottom plate 112 and is approximately arranged on a symmetrical center line of the two notched side plates 116. The supporting plate 119 is formed on the surface 112a of the bottom plate 112 and is perpendicularly connected to the two notched side plates 116 and the spacer plate 118. The supporting plate 119 is formed with two clamping slots 119a respectively in a space between the spacer plate 118 and the two notched side plates 116, where the clamping slots 119a are configured to clamp an optical fiber bundle that is inserted inside the base 110.

The pull tab 120 includes one horizontal beam 124. Two opposite ends of the horizontal beam 124 perpendicularly extend to form two connecting arms 126. The rotary shafts 122 of the pull tab 120 are symmetrically arranged at one end of inner sides of the two connecting arms 126 that is far away from the horizontal beam 124. One limiting bar 128 is arranged at a position of the inner side of each of the connecting arms 126 that is close to the rotary shaft 122. One opening 123 is arranged at one end of each of the connecting arms 126 that is close to the horizontal beam 124. At a middle portion of each of the connecting arms 126, one sliding hole 125 formed through the inner and outer sides of the connecting arm 126 is arranged.

In this embodiment, the elastic piece 130 is a torsion spring but is not limited to a torsion spring. The elastic piece may also be replaced with a similar elastic structure like a leaf spring with two elastic arms or a bent spring plate.

Each of the sliding plates 140 includes one stripe-shaped main body 142, two sliding wings 144, one convex block 146, and one sliding column 148. The main body 142 includes a front surface 142a, a rear surface 142b opposite to the front surface 142a, a front end surface 142c, a rear end surface 142d opposite to the front end surface 142c, and two side end surfaces 142e between the front surface 142a, the rear surface 142b, the front end surface 142c, and the rear end surface 142d. One bevel 142f gradually inclining towards the front end surface 142c is formed at a position of the front surface 142a of the main body 142 that is close to the front end surface 142c. The two sliding wings 144 are respectively arranged symmetrically on the two side end surfaces 142e of the main body 142 and at a certain distance from the rear end surface 142d of the main body 142. In this embodiment, one side of the sliding wing 144 that is close to the front surface 142a of the main body 142 is lower than the front surface 142a. The two sliding wings 144 may be connected together by one reinforcing plate 143 arranged on the rear surface 142b of the main body 142 to increase the strength of the two sliding wings 144. The convex block 146 is arranged on the front end surface 142c of the main body 142, and protrudes towards one side where the front surface 142a of the main body 142 is located. A transition section 146a is formed at one side of the convex block 146 that is connected to the front end surface 142c, where the transition section 146a is opposite to the bevel 142f of the main body 142, and the transition section 146a may be a bevel, a concave arc, or a convex arc. The sliding column 148 is arranged at a position of the rear surface 142a of the main body 142 that is close to the rear end surface 142d.

The front cover 150 includes one cover plate 152 and two blocking columns 154 formed on the cover plate 152. The cover plate 152 includes one top surface 152a and one bottom surface 152b corresponding to the top surface 152a. A through hole 1522 opposite to the locking hole 1164 on the base 110 is arranged on the cover plate 152, where the through hole 1522 is formed through the top surface 152a and the bottom surface 152b of the cover plate 152. A positioning column 1524 opposite to the positioning hole 1166 on the base 110 is arranged at a position of the bottom surface 152b of the cover plate 152 that is close to the through hole 1522, and the positioning hole 1524 may be received in the positioning hole 1166. One groove 1526 with one end formed through an end surface of the cover plate 152 is arranged respectively at positions of the bottom surface 152b of the cover plate 152 that are located at an outer side of the through hole 1522 and the positioning column 1524. Two yielding notches 1528 are symmetrically formed on the other end of the cover plate 152 that is far away from the grooves 1526. The blocking columns 154 are arranged at end portions of the bottom surface 152b of the cover plate 152 that are located between the two yielding notches 1528 and far away from the grooves 1526.

Figure 4:
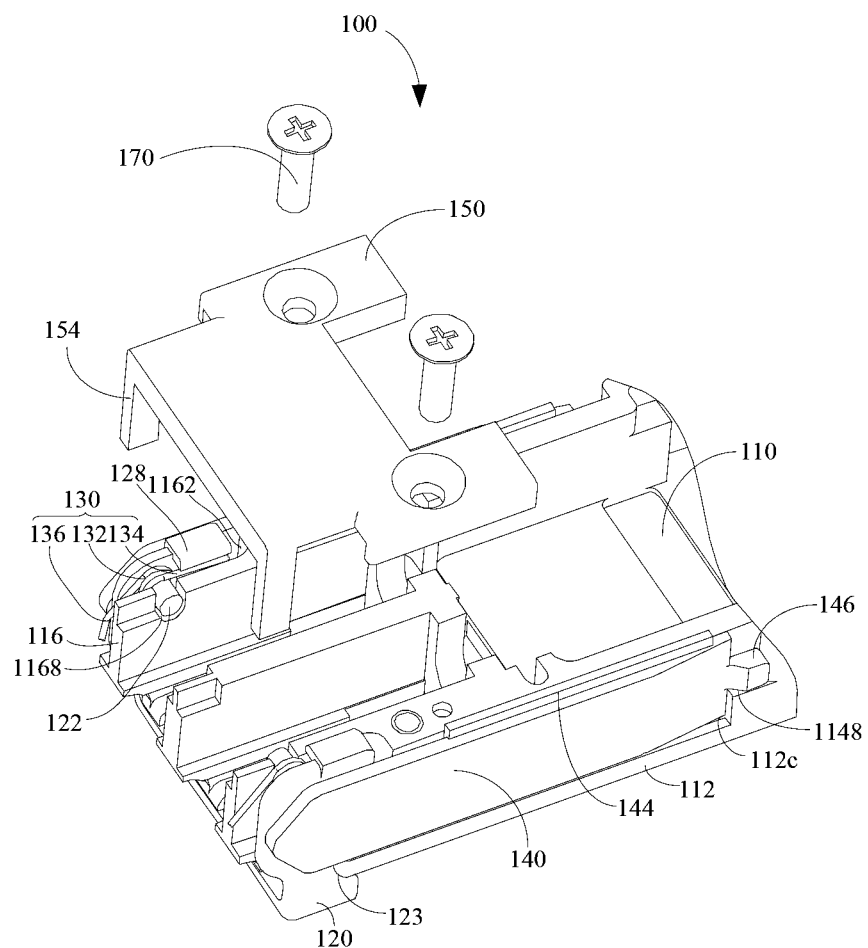
FIG. 4 is a schematic partial assembly diagram of the pluggable apparatus in FIG. 2.
Figure 5:
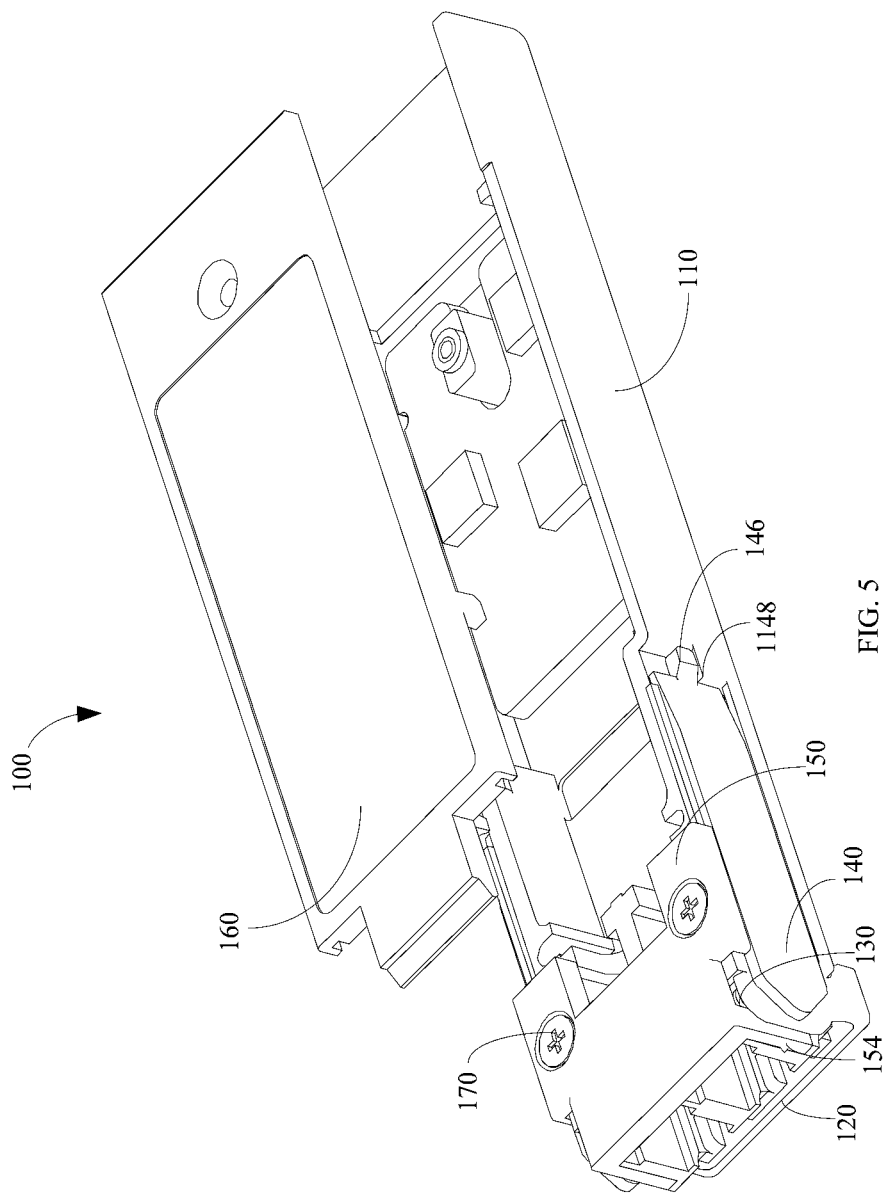
FIG. 5 is a schematic full assembly diagram of the pluggable apparatus in FIG. 2.

Referring to FIG. 4 and FIG. 5, during assembly, first, the elastic piece 130 is assembled onto the pull tab 120, where the connecting portion 132 of the elastic piece 130 is sleeved onto the rotary shaft 122 of the pull tab 120, and the first elastic arm 134 of the elastic piece 130 is held against the limiting bar 128 of the pull tab 120. Then, the pull tab 120 is assembled along with the elastic piece 130 onto the base 110, where the rotary shafts 122 of the pull tab 120 are respectively inserted into the bearing notches 132 on the notched side plates 116 of the base 110, and the connecting arms 126 of the pull tab are received in the notches 1162 of the notched side plates 116 of the base 110. The opening 123 on the connecting arm 126 of the pull tab is detachably engaged at one end of the bottom plate 122 of the base 110 that is close to the notched side plate 116. Then, the sliding plates 140 are assembled onto the base 110 already assembled with the pull tab 120 and the elastic piece 130, where the sliding wings 144 on one side of the sliding plates 140 are respectively inserted into the limiting grooves 112c on the bottom plate 112 of the base 110, and the sliding columns 148 of the sliding plates 140 are slidably inserted into the sliding holes 125 (not shown) on the pull tab 120 respectively, and the convex blocks 146 of the sliding plates 140 are located on the supporting block 1148 of the bottom plate 112. Then, the front cover 150 is assembled onto the base 110, where a certain pre-pressure is applied to the second elastic arm 136 of the elastic piece sleeved on the rotary shaft 122 towards the first elastic arm 134 so that the second elastic arm 136 is elastically deformed to a certain degree under the pre-pressure. Then, the front cover 150 is arranged on the notched side plate 116 of the base 110 so that the blocking column 154 of the front cover 150 is held against the base 110, and the second elastic arm 136 of the elastic piece 130 is held against an inner side of the blocking column 154 of the front cover 150. Then, the positioning column 1524 of the front cover 150 is inserted into the positioning hole 1166 of the base 110, and at the same time, the sliding wings at the other side of the two sliding plates 140 are respectively clamped into the grooves 1526 of the front cover 150. Finally, the front cover 150 is fixed onto the base 110 by inserting one fastener 170, for example, one screw, through the through hole 1522 of the front cover 150.

Figure 6:
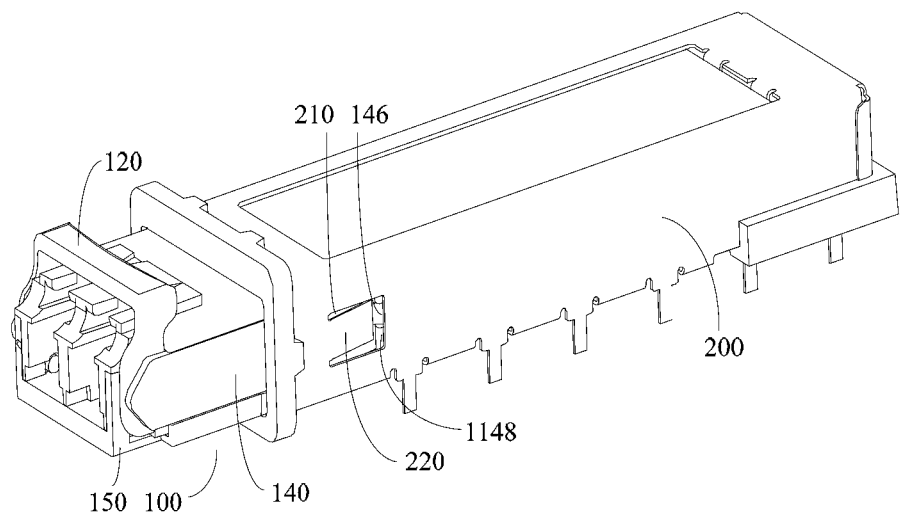
FIG. 6 shows the pluggable apparatus in FIG. 1 when being used.
Figure 7:
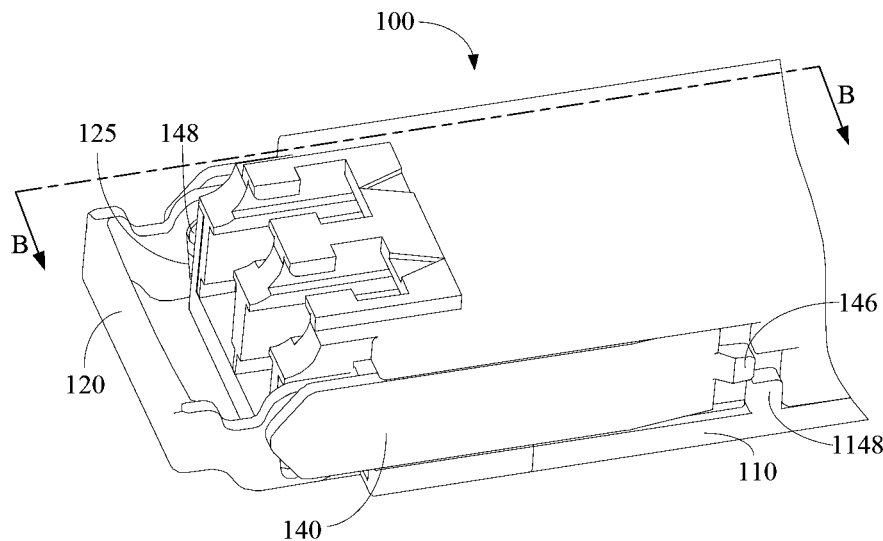
FIG. 7 shows the pluggable apparatus in FIG. 1 when being unlocked.
Figure 8:
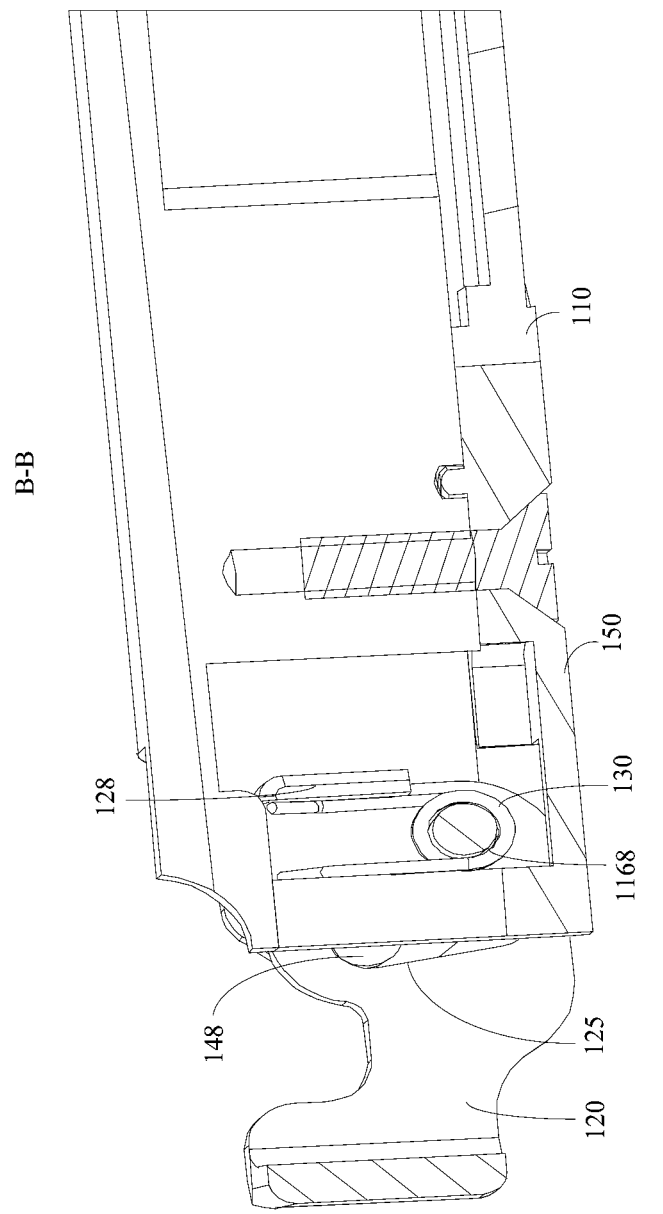
FIG. 8 is a sectional diagram of the pluggable apparatus in FIG. 7 along B-B when being unlocked.

Referring to FIG. 6 to FIG. 8, in use, the pluggable apparatus 100 is clamped into a holder 200 complying with the XFP MSA protocol specification. The holder 200 has one accommodation space 210. Two spring plates 220 bent towards the inside of the accommodation space 210 are respectively arranged on side walls on two sides of the holder 200. When the pluggable apparatus 100 is inserted into the accommodation space 210 of the holder 200, end portions of the spring plates 220 are clamped into the sliding grooves 1146 of the base 110 of the pluggable apparatus 100 and held against an end portion of the supporting plate 1148 and the convex blocks 146 of the sliding plates 140. If the pluggable apparatus 100 needs to be removed from the holder 200, it only needs to pull the pull tab 120, so that the pull tab 120 rotates along the bearing notch 1168 of the base 110. During this process, after the pull tab 120 freely rotates a certain angle, the sliding hole 125 of the pull tab 120 will make the pull tab 120 drive the sliding columns 148 arranged in the sliding holes 125 to move accordingly. Driven by the pull tab 120, the sliding columns 148 will drive the sliding plates 140 to slide in a direction away from the accommodation space 210 of the holder 200 along the limiting groove 112c on the bottom plate 112 and the groove 1526 on the cover plate 150. As the sliding plates 140 slide, the convex blocks 146 of the sliding plates 140 will be held against the spring plates 220 of the holder 200, and will gradually lift up the spring plates 220 in a direction away from the accommodation space 210 until the spring plates 220 disengage from the sliding grooves 1146 of the base 110. At this time, the pluggable apparatus 100 is unlocked. In addition, during rotation of the pull tab 120, the elastic piece 130 elastically clamped between the pull tab 120 and a rear cover 150 will be gradually compressed. When the pluggable apparatus 100 is unlocked and the pressure applied to the pull tab 120 is released, the elastic piece 130 will return to an initial position under the action of an elastic force. During this process, the pull tab 120 and the sliding plates 140 connected to the pull tab will return to initial positions under the action of the elastic piece 130. In this way, the pull tab 120 and the sliding plates 140 are automatically reset.

In addition, the pluggable apparatus 100 may further include one rear cover 160. The rear cover 160 is close to the front cover 150 and is arranged on the base 110 so as to form one enclosed accommodation space together with the front cover 150 and the base 110 for arranging electronic devices such as a circuit board of the XFP module.

With the pluggable apparatus 100 in the embodiments of the present invention, the pluggable apparatus 100 automatically resets through one elastic piece 130 after the pluggable apparatus 100 is unlocked, making the pluggable apparatus 100 easy to use. In addition, the pluggable apparatus 100 can be unlocked without separate components such as pins, rivets, and rotary shafts. Therefore, with a simple functional structure, the pluggable apparatus 100 is easy to manufacture, thereby reducing the manufacturing cost and increasing the productivity.

What is claimed is:

1. A pluggable apparatus, comprising a base, a pull tab, an elastic piece, two sliding plates, and a front cover, wherein:
   the pull tab comprises two rotary shafts arranged symmetrically and is rotatably arranged at one end of the base through the rotary shafts;
   the elastic piece comprises a first elastic arm and a second elastic arm arranged with a spacing from the first elastic arm, and the elastic piece is arranged on one of the rotary shafts of the pull tab and is held against the pull tab through the first elastic arm;
   the two sliding plates are slidably arranged on two sides of the base and are connected to the pull tab; the front cover is arranged on one end of the base where the pull tab is arranged, and is held against the second elastic arm of the elastic piece; and
   the pull tab drives the sliding plates to slide along the base by rotation thereof so as to unlock the pluggable apparatus; and the first elastic arm and the second elastic arm of the elastic piece approach each other to generate an elastic deformation during the unlocking process, and push the pull tab and the sliding plates to return to initial positions after the unlocking process is completed.

2. The pluggable apparatus according to claim 1, wherein the elastic piece further comprises a connecting portion; the first elastic arm and the second elastic arm are respectively connected to the connecting portion; and the elastic piece is sleeved onto the rotary shaft of the pull tab through the connecting portion.

3. The pluggable apparatus according to claim 1, wherein:
   the base comprises a bottom plate and two side plates arranged in parallel on two sides of the bottom plate;

each of the side plates comprises a front plate and a rear plate connected to the front plate;
each of the rear plates is connected to the corresponding front plate in a parallel and staggered mode;
one sliding groove is formed among an outer side surface of the rear plate, an upper surface of the bottom plate, and an end surface of the front plate that is closer to the rear plate than another end surface; and the sliding plates are respectively arranged in grooves.

4. The pluggable apparatus according to claim 3, wherein:
one supporting block lower than the side plate is formed at a junction of the front plate and the rear plate of the side plate and the bottom plate;
each of the sliding plates comprises one main body, one convex block, and one sliding column;
the main body of each of the sliding plates comprises a front surface, a rear surface opposite to the front surface, a front end surface, a rear end surface opposite to the front end surface, and two side end surfaces between the front surface, the rear surface, the front end surface, and the rear end surface;
the convex block is arranged on the front end surface of the main body and protrudes towards one side where the front surface of the main body is located;
the sliding column is arranged at a position of the rear surface of the main body that is closer to the rear end surface than other positions of the rear surface of the main body; and
a sliding hole corresponding to the sliding column is arranged on the pull tab, and the sliding column is received in the sliding hole; and the convex block corresponds to a space above the supporting block.

5. The pluggable apparatus according to claim 4, wherein a transition section is formed at one side of the convex block that is connected to the front end surface, and the transition section is at least one of the group consisting of a bevel, a concave arc, and a convex arc.

6. The pluggable apparatus according to claim 4, wherein each of the sliding plates further comprises two sliding wings; the two sliding wings are respectively arranged symmetrically on the two side end surfaces of the main body and at a certain distance from the rear end surface of the main body; one limiting groove is arranged at a position of the bottom plate of the base that is closer to the rear plate than other positions of the bottom plate of the base; one of the sliding wings of the sliding plate is arranged in the limiting groove; and a groove that corresponds to and receives the other sliding wing of the sliding plate is arranged on the front cover.

7. The pluggable apparatus according to claim 6, wherein a bevel gradually inclining towards the front end surface is formed at a position of the front surface of the main body of the sliding plate that is closer to the front end surface than other positions of the front surface of the main body of the sliding plate.

8. The pluggable apparatus according to claim 4, wherein the base further comprises two notched side plates; the notched side plates are formed on the bottom plate and are respectively connected to end portions of the two rear plates; a notch is arranged at one end of an outer side wall of each of the notched side plates that is farther away from the rear plate than another end of the outer side wall of each of the notched side plates; one bearing notch is arranged at a position of an inner side wall of each of the notched side plates that corresponds to an end portion of the notch; the pull tab comprises one horizontal beam and two connecting arms perpendicularly extending from two opposite ends of the horizontal beam; the rotary shafts of the pull tab are symmetrically arranged at one end of inner sides of the two connecting arms that is farther away from the horizontal beam than another end of the inner sides of the two connecting arms, and are respectively inserted into the bearing notches; the sliding holes are respectively arranged at a middle portion of each of the connecting arms; and the connecting arms of the pull tab are respectively arranged in the notches of the notched side plates.

9. The pluggable apparatus according to claim 8, wherein the front cover is arranged on the notched side plate of the base; a locking hole is formed at a position of a top wall of each of the notched side plates that is closer to the notch than other positions of the top wall of each of the notched side plates; a through hole opposite to the locking hole is arranged on the front cover; and the front cover is fixed onto the base through a fastener that extends through the through hole and is locked in the locking hole.

10. The pluggable apparatus according to claim 8, wherein a limiting bar is arranged at a position of the inner side of each of the connecting arms that is closer to the rotary shaft than other positions of the inner side of each of the connecting arms; the first elastic arm of the elastic piece is held against the limiting bar; the front cover comprises two blocking columns; the blocking columns are held against the base, and the second elastic arm of the elastic piece is held against an inner side of the blocking column.

11. The pluggable apparatus according to claim 10, wherein the front cover further comprises one cover plate; the cover plate comprises one top surface and one bottom surface that corresponds to the top surface; the groove is arranged at a position of the bottom surface of the cover plate that is located at an outer side of the through hole; two yielding notches are symmetrically formed on the other end of the cover plate that is opposite to the grooves; and the blocking columns are arranged at end portions of the bottom surface of the cover plate that are located between the two yielding notches and is opposite to the grooves.

* * * * *

UNITED STATES PATENT AND TRADEMARK OFFICE
CERTIFICATE OF CORRECTION

| | | |
|---|---|---|
| PATENT NO. | : 8,465,215 B1 | Page 1 of 1 |
| APPLICATION NO. | : 13/763254 | |
| DATED | : June 18, 2013 | |
| INVENTOR(S) | : Huang et al. | |

It is certified that error appears in the above-identified patent and that said Letters Patent is hereby corrected as shown below:

Title page, (71) Applicant's City "Guangdong (CN)" should read -- Shenzhen (CH) --.

Signed and Sealed this
First Day of October, 2013

Teresa Stanek Rea
*Deputy Director of the United States Patent and Trademark Office*